A. BERG.
POLE CLIMBING SCAFFOLD.
APPLICATION FILED FEB. 5, 1918.
1,299,289.
Patented Apr. 1, 1919.
3 SHEETS—SHEET 3.
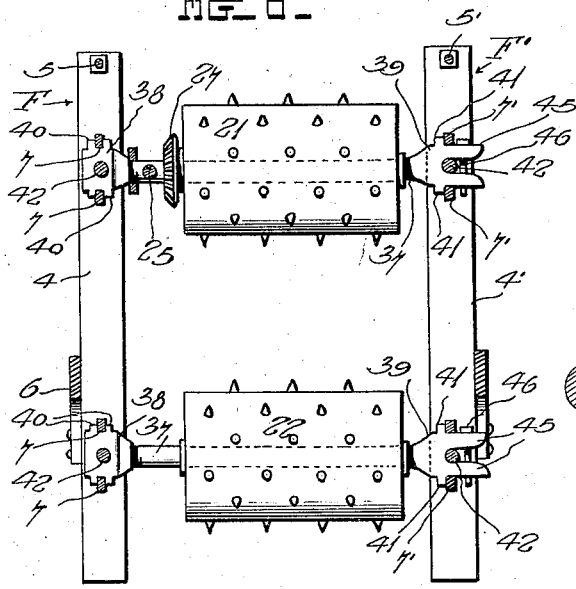
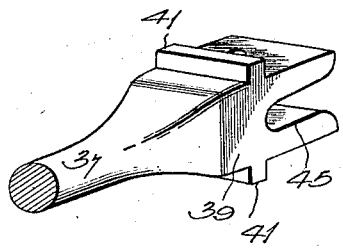
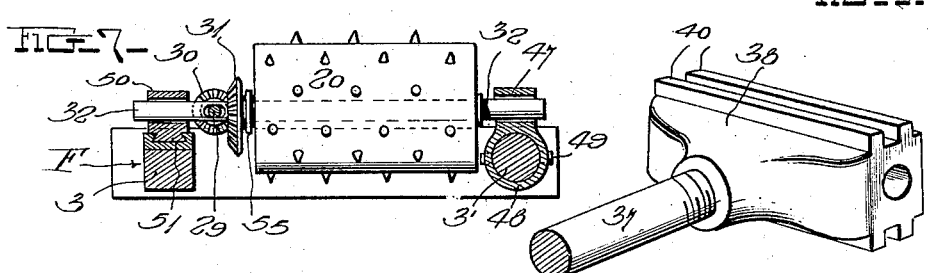
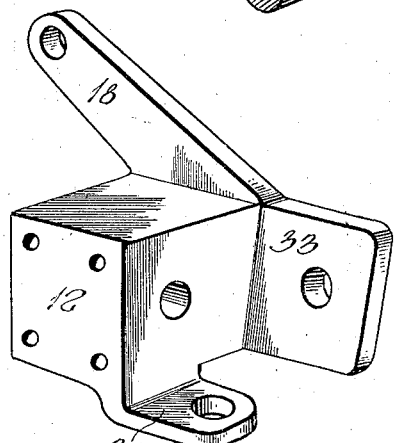
Witness
H. Woodard
Inventor
A. Berg
By H. R. Wilson & Co.
Attorneys

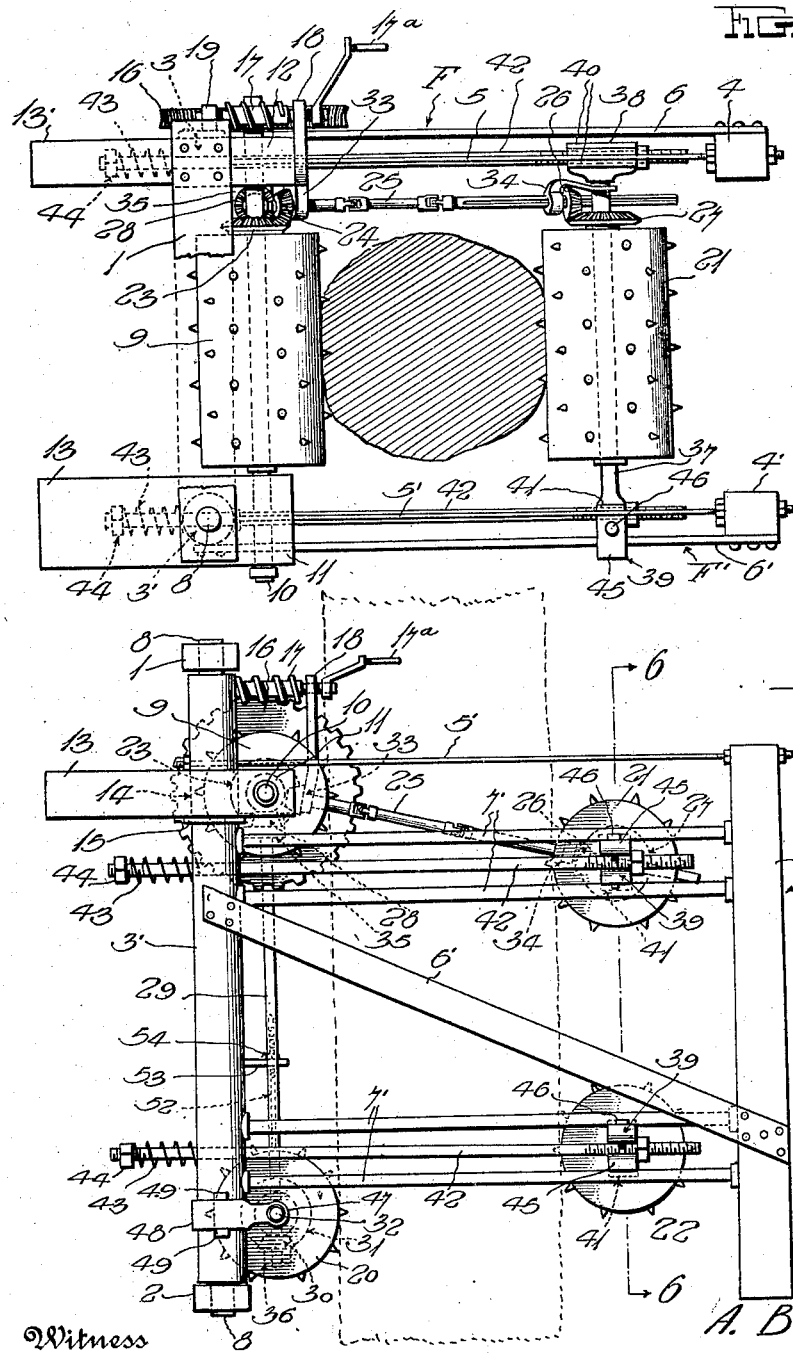

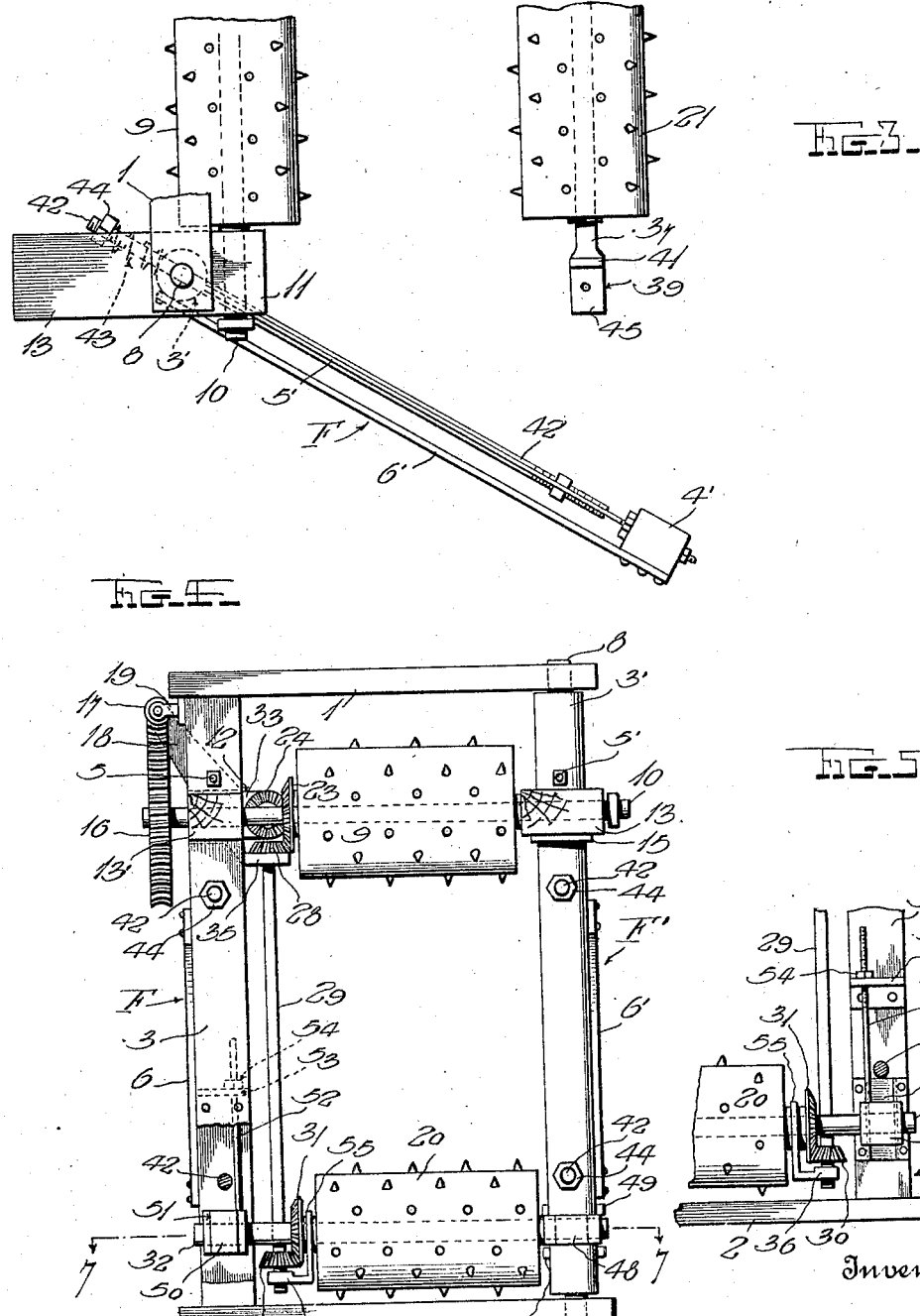

UNITED STATES PATENT OFFICE.

AUGUST BERG, OF BROWNSVILLE, WASHINGTON.

POLE-CLIMBING SCAFFOLD.

1,299,289.  Specification of Letters Patent.  Patented Apr. 1, 1919.

Application filed February 5, 1918. Serial No. 215,557.

*To all whom it may concern:*

Be it known that I, AUGUST BERG, a citizen of the United States, residing at Brownsville, in the county of Kitsap and State of Washington, have invented certain new and useful Improvements in Pole-Climbing Scaffolds; and I do declare the following to be a full, clear, and exact description of the invention, such as will enable others skilled in the art to which it appertains to make and use the same.

My invention relates to improvements in scaffolding and has for its object to provide a simply constructed and inexpensive, yet a highly efficient and durable scaffold which will climb poles, trees and the like.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a top plan view of the improved scaffold;

Fig. 2 is a side elevation;

Fig. 3 is a partial top plan showing the manner in which one of the side frames may be swung outwardly for passage of the device around a pole or the like;

Fig. 4 is an end elevation partly broken away;

Fig. 5 is an elevation of the means for steering one of the pole engaging rollers;

Fig. 6 is a vertical transverse section on the plane of the line 6—6 of Fig. 2;

Fig. 7 is a horizontal section on the plane indicated by the line 7—7 of Fig. 4;

Figs. 8 and 9 are perspective views of the two slides and portions of the shaft which extend between them; and Fig. 10 is a perspective view of one of the bearings to be described.

Briefly speaking, the invention consists of a frame structure to surround the pole or tree, and pole engaging means mounted on said structure and including one or more driven toothed rollers, one side of the frame being capable of swinging outwardly as shown in Fig. 3 so that the device may be passed around a pole or the like or removed therefrom whenever necessary.

The structure above mentioned consists of a side frame F, upper and lower transverse bars 1 and 2 extending rigidly therefrom, and a second side frame F' which is pivoted to said transverse bars upon a vertical axis. Frame F includes vertical end bars 3 and 4, a tie rod 5 and brace 6 extending between them, and upper and lower pairs of horizontal tracks 7 also extending between said bars. (See Fig. 6.) It is to the upper and lower ends of the end bar 3 that the transverse bars 1 and 2 are rigidly secured in any preferred manner.

Frame F' includes end bars 3' and 4', a tie rod 5' and brace 6' extending between said end bars, and upper and lower pairs of horizontal tracks 7', the ends of the bar 3' having vertical trunnions 8 passing through the adjacent ends of the transverse bars 1 and 2, whereby frame F' is permitted to swing outwardly to the position shown in Fig. 3.

Extending between the frames F and F', adjacent the transverse bar 1, is a toothed roller 9, the shaft 10 of said roller being rotatably mounted in suitable bearings 11 and 12, the former being formed by the inner end of a horizontal supporting arm 13 for a platform or the like, whereas the bearing 12 is bolted or otherwise secured to the inner surface of the end bar 3. Arm 13 is provided with an opening 14 through which the end bar 3' passes loosely, said bar being provided with a collar 15 upon which said arm rests. Another arm 13' extends from the end bar 3 in the same plane with the arm 13, so that the two coöperate in supporting a suitable platform or the like.

One end of shaft 10 extends beyond the frame F and is provided with a worm gear 16 with which a worm 17 meshes, one end of said worm being supported by an inclined arm 18 which rises from the bearing 12, whereas an appropriate bearing 19 is secured to the end bar 3 for supporting the other end of the worm. Any suitable means such as a hand crank 17ª may be employed for rotating worm 17 and when this is done it will be obvious that the climbing roller 9 will be rotated. Rotation of this roller also drives a similar roller 20 located below the same, and a third roller 21 spaced horizontally from roller 9. A fourth roller 22 is provided beneath the roller 21, but this roller is not driven.

A beveled gear 23 is carried by the shaft 10 and meshes with a pinion 24 on one end of a substantially horizontal shaft 25, the other end of said shaft passing slidably through a pinion 26, which meshes with a beveled gear 27 on the roller 21. Gear 23 also meshes with a pinion 28 on a vertical shaft 29 whose lower end is provided with a pinion 30 meshing with a gear 31 rotatable on the shaft 32 of roller 20 and secured to said roller to drive the same, said roller being rotatable on said shaft. One end of shaft 25 is rotatably supported by an ear 33 which extends from the bearing 12, whereas an appropriate bearing 34 supports the other end of said shaft. Bearing 12 is also provided with a horizontal ear 35 which rotatably carries the upper end of shaft 29, whereas the lower end of the shaft is suitably mounted in the bearing 36.

The rollers 21 and 22 are rotatably mounted on their shafts 37, the opposite ends of said shafts being provided with slides 38 and 39 which operate between the tracks 7 and 7' respectively, the slides 38 being provided with ribs 40 positioned on opposite sides of the tracks 7 so that the slides may not move laterally from said tracks, whereas each slide 39 is provided with one rib only on its upper as well as its lower side, these ribs being indicated by the reference numeral 41 and being adapted to contact with the inner sides of the tracks 7'. These tracks, however, are free to move laterally from the slides 39 when the frame F' is swung outwardly.

Each frame F and F', is provided with upper and lower adjusting rods 42 positioned between the tracks thereof for shifting the rollers 21 and 22 into tight engagement with the pole or tree as indicated in Figs. 1 and 2. The rods 42 pass slidably through the end bars 3 and 3' at one end, whereas the other ends of said rods are connected with the slides 38 and 39, coiled springs 43 being positioned on said rods between the aforesaid end bars and nuts or the like 44 on said rod, whereby said springs exert their tension to retain the rollers 21 and 22 in yielding contact with the pole or the like so that all rollers will properly operate, regardless of irregularities in the object upon which the device is mounted. The rods 42 which coöperate with the slides 38, pass directly through said slides as shown for instance in Fig. 6, but in order that the rods 42 for adjusting the slides 39 may swing outwardly with the frame F', said slides 39 are provided with forks 45 in which said rods are received, vertical pins or the like 46 being passed through said forks for holding the rods in place until it is necessary that the frame F' be swung outwardly.

In order to steer the device during its vertical movement, I mount the roller 20 so that one end thereof may be raised and lowered as required. One end of the shaft 32 of roller 20 is loosely mounted in a bearing 47 carried by a collar 48 through which the lower end of the end bar 3' passes rotatably, said collar being held against vertical movement by suitable pins or the like 49. The other end of shaft 32 is loosely mounted in a bearing 50 slidably carried by the end bar 3 and preferably having a dovetail connection 51 therewith. A rod 52 is shown rising from the bearing 50 through an ear 53, and a nut 54 is threaded on said rod above the ear so that adjustment of this nut will so shift the rod and bearing as to steer the roller 20, thus permitting the entire machine to be steered during its travel. It will of course be understood that the angular movement of the shaft 32 is slight and that sufficient clearance exists in the bearings of this shaft to permit such movement. In order to retain the pinion 30 and the gear 31 in mesh, however, during adjustment of roller 20, said pinion is preferably slidable upon the shaft 29 and the bearing 36 is connected with shaft 32 by a suitable arm 55 such as that shown in Figs. 4 and 5.

In operation, the frame F' is swung outwardly to the position of Fig. 3 so that the entire structure may be passed around a pole or tree as indicated in Figs. 1 and 2. This having been done, the frame in question is again moved inwardly to its proper position and the pins 46 then dropped into place, so that further outward movement of the frame is prevented. The rods 42 are now adjusted to force all rollers into proper engagement with the pole or the like and when a platform is supported upon the arms 13—13' or upon other suitable parts of the device, the latter is in condition for use. Turning of the crank 17ª or other driving means provided, will now rotate the rollers 9, 20, and 21, so that the machine will climb the pole to the required elevation. It will be observed that no means other than the rollers is necessary for locking the scaffolding in any adjusted position, due to the fact that the worm and worm gear 17 and 16 respectively, will not permit retrograde movement of these rollers. Whenever necessary, the nut 54 may be adjusted to so steer the machine as to cause it to properly follow the pole or tree upon which it is used.

From the foregoing, taken in connection with the accompanying drawings, it will be obvious that although my invention is of comparatively simple and inexpensive nature, it will be highly efficient and durable. Since probably the best results are obtained from the several specific details shown and described, these details are preferably employed, but I wish it understood that within the scope of the invention as claimed, numerous minor changes may well be made.

I claim:

1. A pole-climbing scaffold comprising a side frame for disposition at one side of the pole, upper and lower bars extending laterally from one end of said frame, a second side frame pivoted on a vertical axis to said bars for disposition at the side of the pole remote from said first named frame, climbing means including a pole engaging roller extending between the two frames, and a detachable connection between said roller and said pivoted side frame.

2. A pole-climbing scaffold comprising a side frame for disposition at one side of the pole, upper and lower bars extending laterally from one end of said frame, a second side frame pivoted on a vertcial axis to said bars for disposition at the side of the pole remote from said first named frame, climbing means including a pole engaging roller extending between the two frames, each of said side frames having a pair of horizontal tracks, slides for supporting the ends of said roller, said slides being movable between said tracks and the tracks of said pivoted frame being movable away from their respective slide when said frame is swung outwardly, adjusting rods for said slides positioned between said tracks, the slide adjacent the pivoted frame having a laterally opening fork receiving its respective adjusting rod, and means for retaining said rod in said fork until outward swinging of the pivoted frame is required.

3. A pole-climbing scaffold comprising a frame structure and climbing means mounted thereon, said climbing means including upper and lower rollers to engage one side of the pole, and means for steering one of said rollers.

4. A pole-climbing scaffold comprising a frame structure and climbing means mounted thereon, said climbing means including upper and lower rollers to engage one side of the pole, and means for raising and lowering one end of one of said rollers to steer the machine.

In testimony whereof I have hereunto set my hand in the presence of two subscribing witnesses.

AUGUST BERG.

Witnesses:
NILS GILLGREN,
ELLEN DEDBERG.

Copies of this patent may be obtained for five cents each, by addressing the "Commissioner of Patents, Washington, D. C."